US010583473B2

(12) United States Patent
Linzer et al.

(10) Patent No.: US 10,583,473 B2
(45) Date of Patent: Mar. 10, 2020

(54) METHOD AND DEVICE FOR STABILIZING A MOVEMENT OF A ROLLED METAL BAND ON A ROLLER TABLE

(71) Applicant: Primetals Technologies Austria GmbH, Linz (AT)

(72) Inventors: Bernd Linzer, Leombach (AT); Pascal Ostheimer, Linz (AT); Juergen Schiefer, Allhaming (AT); Michael Zahedi, St. Marien (AT)

(73) Assignee: PRIMETALS TECHNOLOGIES AUSTRIA GMBH (AT)

( * ) Notice: Subject to any disclaimer, the term of this patent is extended or adjusted under 35 U.S.C. 154(b) by 0 days.

(21) Appl. No.: 16/303,924

(22) PCT Filed: May 24, 2017

(86) PCT No.: PCT/EP2017/062587
§ 371 (c)(1),
(2) Date: Nov. 21, 2018

(87) PCT Pub. No.: WO2017/207396
PCT Pub. Date: Dec. 7, 2017

(65) Prior Publication Data
US 2019/0337033 A1 Nov. 7, 2019

(30) Foreign Application Priority Data
May 31, 2016 (EP) .................................. 16172244

(51) Int. Cl.
*B21B 39/12* (2006.01)
*B21B 39/14* (2006.01)
(Continued)

(52) U.S. Cl.
CPC .............. *B21B 39/12* (2013.01); *B21B 39/14* (2013.01); *B65G 21/209* (2013.01); *B21B 37/46* (2013.01);
(Continued)

(58) Field of Classification Search
CPC ......... B21B 39/12; B21B 39/14; B21B 37/68; B21B 45/0218; B21C 47/3466; B65G 21/209
(Continued)

(56) References Cited

U.S. PATENT DOCUMENTS 3,119,534 A * 1/1964 Lehnert ................... B21C 47/34
226/1
4,945,746 A * 8/1990 Jakimowicz ............ B21B 39/14
198/836.1
(Continued)

FOREIGN PATENT DOCUMENTS

| CN | 2912854 Y | 6/2007 |
|---|---|---|
| CN | 101678420 A | 3/2010 |

(Continued)

OTHER PUBLICATIONS

Chinese Office Action, dated Aug. 14, 2019, issued in corresponding Chinese Patent Application No. 201780034049.0. Total 6 pages.
(Continued)

*Primary Examiner* — Mark A Deuble
(74) *Attorney, Agent, or Firm* — Ostrolenk Faber LLP (57) ABSTRACT

During stabilization of a metal band (1) on a roller path (2), the band (1) is to be only minimally cooled via the stabilisation. A device for that includes multiple protective runners (3), each oriented in the conveyor direction (R), for guiding the band (1), wherein the protective runners (3) are arranged above the roller path (2) and the protective runners (3) are at a distance from one another in a width direction (B) of the band (1). Multiple rows (4) of nozzles are arranged in the conveyor direction (R) or in the width direction (B) of the band. Each row (4) of nozzles includes multiple nozzles (5). The nozzles (5) are set back in relation to an underside of the protective runners (3), such that an arched band (1) cannot come into contact with the nozzles (5). A compressed air
(Continued)

supply (6) and a network of tubes or pipelines (7) supply the nozzles (5) with compressed air, wherein the nozzles (5) apply compressed air to the upper side of the band (1) in order to stabilize the movement of the band (1) on the roller path (2).

18 Claims, 9 Drawing Sheets

(51) Int. Cl.
      *B65G 21/20*       (2006.01)
      *B21B 37/46*       (2006.01)
      *B21B 45/02*       (2006.01)
      *B21B 37/68*       (2006.01)
      *B21C 47/34*       (2006.01)

(52) U.S. Cl.
      CPC .......... *B21B 37/68* (2013.01); *B21B 45/0218* (2013.01); *B21C 47/3466* (2013.01)

(58) Field of Classification Search
      USPC .............................................. 198/493, 836.1
      See application file for complete search history.

(56) References Cited

U.S. PATENT DOCUMENTS

| | | | |
|---|---|---|---|
| 5,937,688 A * | 8/1999 | Secen | B21B 39/14 72/200 |
| 7,328,598 B2 * | 2/2008 | Cramer | B21B 39/14 266/46 |
| 8,459,083 B2 | 6/2013 | Poloni | |
| 8,931,321 B2 * | 1/2015 | Ueoka | B21B 45/0233 72/201 |
| 9,878,358 B2 * | 1/2018 | Chen | B21B 45/0218 |
| 2010/0024505 A1 * | 2/2010 | Ueoka | B21B 45/0233 72/202 |
| 2018/0215556 A1 * | 8/2018 | Lee | B65G 47/244 |

FOREIGN PATENT DOCUMENTS

| | | |
|---|---|---|
| CN | 102378655 A | 3/2012 |
| DE | 19643524 A1 | 4/1998 |
| JP | H07-323321 A | 12/1995 |
| JP | H08-174031 A | 7/1996 |
| JP | H08-174033 A | 7/1996 |
| JP | 3275997 B2 | 4/2002 |
| KR | 10-2012-0032855 A | 4/2012 |
| KR | 10-2012-0044180 A | 5/2012 |
| KR | 10-2013-0046600 A | 5/2013 |

OTHER PUBLICATIONS

International Search Report dated Jul. 10, 2017 in corresponding PCT International Application No. PCT/EP2017/062587.
Written Opinion dated Jul. 10, 2017 in corresponding PCT International Application No. PCT/EP2017/062587.
Extended European Search Report dated Sep. 6, 2016 in corresponding European Patent Application No. 16172244.2.

* cited by examiner

METHOD AND DEVICE FOR STABILIZING A MOVEMENT OF A ROLLED METAL BAND ON A ROLLER TABLE

CROSS-REFERENCE TO RELATED APPLICATIONS

The present application is a 35 U.S.C. §§ 371 national phase conversion of PCT/EP2017/062587, filed May 24, 2017, which claims priority of European Patent Application No. 16172244.2, filed May 31, 2016, the contents of which are incorporated by reference herein. The PCT International Application was published in the German language.

FIELD OF TECHNOLOGY

The present invention relates to a device and a method for stabilizing a rolled metal band, preferably a steel band, which is moved on a roller table in a hot-rolling mill.

TECHNICAL BACKGROUND

In a hot-rolling mill or thin slab casting and rolling TSCR, especially an Arvedi-ESP thin slab casting and rolling TCSR, a hot metal band can be produced in a multiplicity of ways:

In the so-called batch mode, a slab is rolled in at least one roll train, forming a finished band. The finished band is cooled in a cooling zone and then wound up by means of a winding device, forming coils.

In the so-called semi-endless mode, an endless strand is pre-rolled in a first roll train, forming an intermediate band with a thickness of 15 mm. The intermediate band is split up by means of shears, finally rolled in a second roll train, forming a finished band with final thicknesses of 3.5 mm, then cooled in a cooling zone and after that wound up by means of one or more winding devices, forming coils. The speeds of the finished hot band are approximately 3 m/s maximum in this case, depending on the final thickness. With this relationship of minimum final thickness and maximum band speed, the band heads can be stably transported over the roller table toward the winding device.

In the so-called endless mode, an endlessly cast strand is rolled in a first and second roll train, the finished band is cooled in a cooling zone and after that it is wound up in a winding device, forming coils. The resulting hot band is split into suitable lengths by so-called flying shears located immediately upstream of the winding device and wound in an alternating manner on the winding devices, forming steel coils. With this method, hot bands with final thicknesses of between 0.6 and 6 mm are produced. These hot bands can have a maximum speed of 17 m/s, depending on the final thickness.

In the endless mode, after cutting, the band heads are transported over roller tables to one of the two winding plants, optionally to a third winding plant, where the winding up takes place. In the process, the band heads also run through the winding driver. Since bands in a lower thickness range (up to 0.6 mm) have only a very low rigidity, during their forward movement, the band heads can be bent up in the event of sudden contact impact with the transporting rollers. After this time point, as a consequence of the altered inflow conditions and pressure conditions between the upper and lower sides of the band head, strong lift forces occur, which depend on the inflow speed and the angle between the band head and the horizontal. The gravity force of the bent up band section acts in opposition to the lift forces (see FIG. 1). If the lift force is greater than the gravity force, then the band head lifts away from the roller table. The movement of the band becomes unstable, the band begins to "fly" and possibly folds back (see FIGS. 2a to 2c). These occurrences lead to a loss of quality of the bands and can also lead to a so-called "cobble" with mill shutdown.

Background of the Invention and Prior Art

JP 08 174 031 A and JP 08 174 033 A describe the prevention of the bending up of band heads in the run-out of a finishing roll train by means of a plurality of series-arranged pneumatic beams with a plurality of pneumatic nozzles in each case. Upstream distance sensors measure the height of the band deformation and, based on the measured values, the air quantity or pressure applied to the band is adjusted.

As a result of the measuring and the subsequent adjusting of the pressurized air, these devices are not suitable for high band speeds.

JP 3 275997 B2 describes an endlessly operating run-out and winding region. Shears located upstream of the winding device split up the endlessly conveyed band. For avoiding band run instabilities (bending up, flying), guide elements, from which air discharges transversely to the band run direction at high velocity, are lowered in the direction of the band. As a result, a pressure difference ensues between the upper side and lower side of the band, effecting a slight suction and consequently stabilizes the band run in the head region.

KR 20120044180 A discloses a device for avoiding the bending up of a band head using a plurality of nozzle rows, arranged in the width direction in each case, with spray nozzles and rollers arranged between the nozzle rows. Although the spray nozzles in certain embodiments have a distance to the lower side of the rollers, a collision between the bent up band head and the spray nozzles cannot be excluded, especially in the event of a failure of the pressure supply for the spray nozzles. How the device can be improved does not appear from the document.

KR 2013 04 66 00 A describes a device for avoiding the lifting of a band head by means of a multiplicity of upward lying fans which blow air via nozzle plates in the band direction. Arranged between the nozzles plates are small, rotatably mounted rollers which in the event of a rising band head are to prevent a collision. This solution has the following disadvantages:

- The fans create large air flows with low positive pressure and therefore require a large installation space and also large pipe cross sections from the fans to the band. It necessitates large and heavy pieces of apparatus which for maintenance purposes have to be lifted or ideally folded up.
- The above arranged and rotatably mounted rollers in many cases do not provide a suitable collision protection against rising band heads, and in particular do not provide a reliable operation of the mill. Depending on the contact angle and contact location of the band head with the apparatus, damage or cobbles can still be created with mill stoppages.

How the rapid movement of a thin band on a roller table can be reliably stabilized by means of air blowing devices without the band being unacceptably severely cooled down or the structure being altered in the process, and how even in the case of a failure of compressed air the band can be adequately stabilized without the blowing devices being damaged, does not appear from the prior art.

SUMMARY OF THE INVENTION

It is the object of the invention to overcome the disadvantages of the prior art and to specify a device and a method for stabilizing the movement of a rolled metal band on a roller table by means of which a fast, thin, metal band
- is stabilized on the roller table,
- is cooled, but only slightly, in the process, and
- the stabilizing itself is adequate in the event of a failure of the compressed air supply and the device is protected against damage.

This object is achieved by a device according to the invention.

The device according to the invention comprises a plurality of protective runners, oriented in the main in the band run direction in each case, for the guiding of a "flying" band. The protective runners are arranged above the roller table and have a distance to each other in the width direction of the band. The protective runners are preferably rounded at the inlet-side end of the device so that the band is guided reliably into the device. Arranged between the protective runners in the band run direction or transversely to the band run direction are a plurality of nozzle rows with a plurality of nozzles in each case. The nozzles are set back in relation to the underside of the protective runners so that a bent up band cannot contact or damage the nozzles. A compressed air supply and a network of hose lines or pipe lines supplies the nozzle rows with compressed air so that the nozzles can apply compressed air to the upper side of the band.

For stabilizing a thin band on a roller table the device according to the invention has either
- a plurality of nozzle rows, oriented in the width direction (i.e. transversely to the band run direction) of the band, which have a distance between each other in the band run direction, or
- a plurality of nozzle rows, oriented in the band run direction, which have a distance between each other in the width direction of the band.

For an adequate guiding of the band, it is advantageous if the device has at least three, five or seven, etc. protective runners.

In order to apply compressed air to the band evenly in its width direction, it is expedient if, in a nozzle row, at least one nozzle is arranged between two protective runners.

The device can be piped in a simple and robust manner if the nozzles of a nozzle row are supplied with compressed air via a common hose line or pipe line.

For reasons of accessibility and maintenance, it is advantageous if the device can be pivoted toward the band and away from the band at a joint, the pivoting preferably oriented in the band run direction, and the pivoting caused by an articulated drive.

It has proved to be favorable, especially with regard to the sound level of the air flow noises through the nozzles, if a nozzle is designed as a single orifice or multi-orifice nozzle, and/or as a round jet or flat jet nozzle, but preferably as a multi-channel flat jet nozzle.

It is expedient, particularly in the case of varying band widths, if the orientation of a nozzle, preferably of a plurality of nozzles, especially preferably of at least one nozzle row, can be adjusted in the band run direction and/or in the band width direction of the band.

It is particularly advantageous if one, a plurality or all of the nozzles of a nozzle row are designed with a shutting off capability. The shutting off can, for example, be carried out by a control valve or a ball cock. For expedience, two nozzles, which are arranged symmetrically to the band longitudinal axis, are shut off. As a result of the shutting off, the compressed air consumption and the noise level in the case of narrower bands are reduced.

It is favorable if the orientation of one or more nozzle rows in relation to the band can be adjusted by an actuator, such as a pneumatic or hydraulic cylinder. As a result, the orientation of the nozzles can be automatically adjusted during operation.

Since the stabilizing of a band on a roller table by a device according to the invention on the one hand requires a lot of compressed air and on the other hand an excessive cooling of the band by compressed air is to be avoided, it is advantageous if a pressure of the compressed air can be adjusted by the compressed air supply and/or by a valve which is arranged between the compressed air supply and a nozzle.

The adjustment of the compressed air quantity or the pressure of the compressed air in a hose line or pipe line is preferably carried out by a pressure or flow rate regulator.

In order to be able to cover consumption peaks even with smaller compressed air supplies it is advantageous if at least one compressed air accumulator and a valve are installed between the compressed air supply and a hose line or pipe line so that the compressed air accumulator can cover consumption peaks, the valve can release and shut off the throughflow of compressed air and the delivery of compressed air can be carried out in a controlled or regulated manner with regard to the pressure or the quantity.

The compressed air accumulator is first of all replenished by means of the compressed air supply, wherein a valve, which is arranged between the outlet of the compressed air accumulator and a nozzle, is closed. For stabilizing the band, the valve is opened, and as a result, compressed air is extracted from the compressed air accumulator. After completion of the stabilizing, the valve is closed again and the compressed air accumulator is charged anew.

It is expedient if the device according to the invention is arranged in a hot rolling mill between shears, which are arranged downstream of a cooling zone, and a winding device, or between two winding devices.

The object according to the invention is also achieved by a method for stabilizing band run of a rolled steel band on a roller table in a hot rolling mill according to the invention.

The steel band has in this case a thickness of $\leq 1.2$ mm, preferably $\leq 0.9$ mm, especially preferably $\leq 0.7$ mm, and moves on a roller table at a speed of $\geq 5$ m/s, preferably $\geq 10$ m/s, especially preferably $\geq 15$ m/s.

In the method according to the invention, the following steps are carried out:
- guiding (e.g. by inward pivoting or lowering) the device according to the invention onto the upper side of the band;
- applying compressed air with a pressure p to the upper side of the band by means of the nozzles of the device, as a result of which the movement of the band on the roller table is stabilized;
- terminating the application of compressed air; and
- guiding the device away (e.g. by upward pivoting or lifting) so that the device is guided away from the upper side of the band.

By means of the guiding, the device is guided onto the upper side of the band, apart from that the region downstream of the shears (in most cases so-called "flying shears") or the region between two winding devices is freely accessible. During the application of compressed air to the upper side of the steel band, supplying the nozzles with compressed air is initially started. Compressed air at a pressure p is then fed to the nozzles. As a result, the movement of the steel band is stabilized. Finally, the application of compressed air is terminated and the device is guided away from the band.

It is expedient if before the application of compressed air, a valve, which is arranged between a compressed air accumulator and a nozzle of the device, is closed, and the compressed air accumulator is then replenished to a pressure p.

During the application of compressed air to the upper side of the steel band, it is expedient if a valve, which is arranged between a compressed air accumulator and a nozzle of the device, is at least partially opened. As a result, the compressed air can flow toward the nozzle at a pressure p. The valve is preferably controlled either in a flow-rate regulated or pressure regulated manner.

BRIEF DESCRIPTION OF THE DRAWINGS

Further advantages and features of the present invention are provided from the subsequent description of not limiting exemplary embodiments, wherein in the following figures.

DESCRIPTION OF THE EMBODIMENTS

Figure 1:
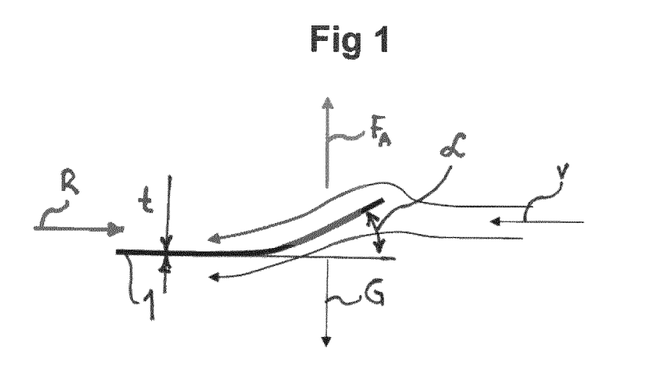
FIG. 1 shows a view of the lift forces $F_A$ on account of the movement of a bent up band 1 on a roller table 2.
Figures 2A, 2B, 2C, 9:
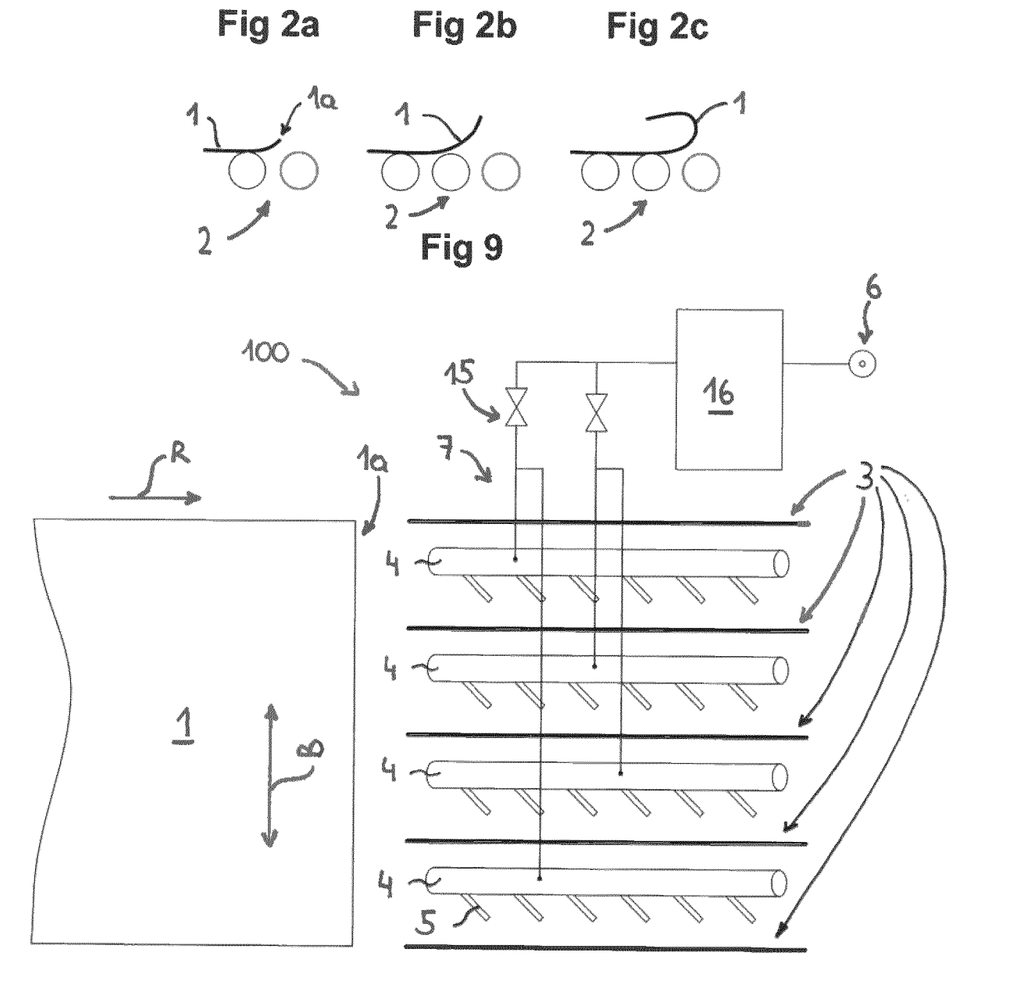
FIGS. 2a-2c show a view of an unstable movement of a band 1.
FIG. 9 shows a schematic view of a device according to the invention with nozzle rows 4 which can be shut off.

FIG. 1 schematically shows the forces $F_A$ and G which act upon a band 1 when the band 1 is moved over a roller table 2. The lift force $F_A$ is proportional to the square of the speed v and dependent on the angle α between the band head 1a and the horizontal. The gravity force G on the other hand is proportional to the band thickness t. If the lift force $F_A$ exceeds the gravity force G, then the band 1 experiences a resulting force $F=F_A-G$ in the upward direction which moves the band 1 upward. If the movement is not stopped, the band begins to "fly", i.e. it lifts off the roller table 2 or the band head 1a is bent round as a result of the flow forces. The flow lines of the air are shown schematically by means of arrows. The different phases during the bending round of a band head are shown in FIGS. 2a to 2c.

Figure 3:
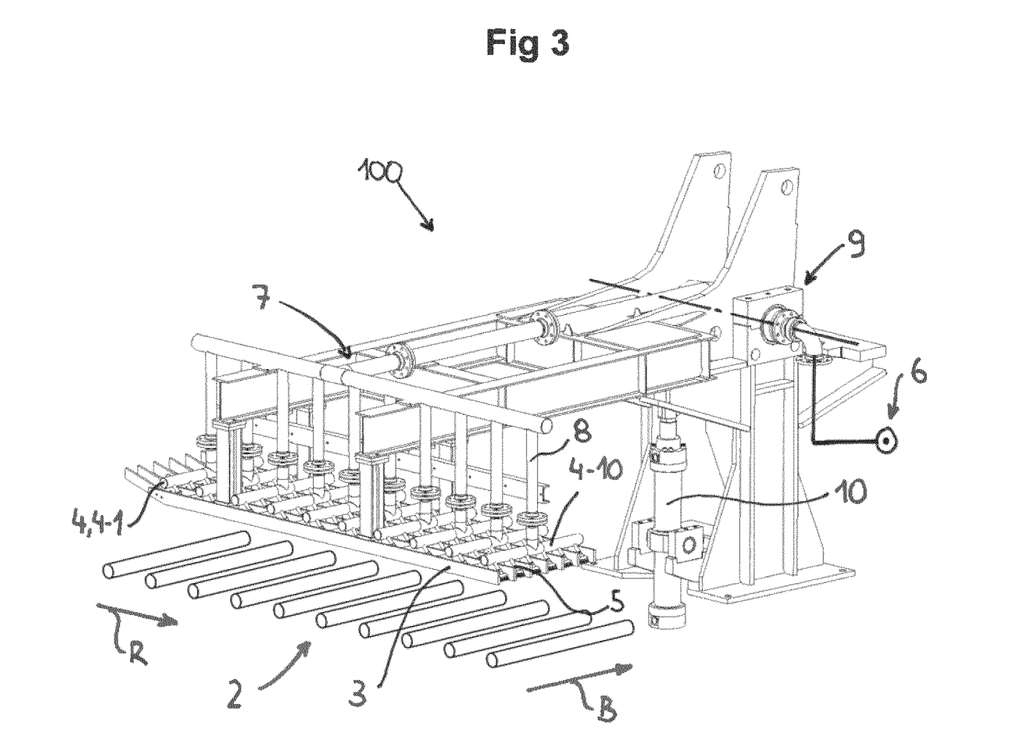
FIG. 3 shows a perspective view of a device 100 according to the invention.

FIG. 3 shows a device 100 according to the invention for stabilizing a rolled metal band on a roller table 2. The device comprises seven protective runners 3, arranged in the band run direction R, for guiding a steel band, not shown, wherein the protective runners 3 have a distance between each other in the width direction B. During operation, the steel band is moved in the band run direction R at a certain speed between the lower side of the protective runners 3 and the roller table 2. The device 100 has ten nozzle rows 4-1 to 4-10, in the band run direction R, wherein each nozzle row has a plurality of nozzles 5 arranged in the width direction B. In order to protect the nozzles 5 against damage, the nozzles 5 are installed in a set-back manner by the distance A in relation to the lower side of the protective runners 3 (see FIGS. 6a and 6c). Therefore, even a bent up band head, as shown in FIGS. 2a to 2c, cannot damage the nozzles. Specifically, the nozzles 5 are designed as flat jet nozzles, as a result of which the sound level of the air flow noises during operation is reduced and the upper side of the band 1 is evenly exposed to compressed air action in the width direction B. In order to be able to move the device 100 toward the band and away from the band, provision is made for an articulated drive 10 and a joint 9. In the retracted state of the articulated drive 10, the band can be stabilized by compressed air. In the extended state of the articulated drive 10, the band is freely accessible, which is particularly favorable during maintenance operations. The compressed air for stabilizing the band is conducted via a compressed air supply 6 to a rotary lead-through arranged in the joint 9, then via a network of pipe lines 7 and common pipe lines 8 to the nozzles 5 of the individual nozzle rows 4-1 to 4-10. The compressed air supply 6 can be a compressed air network already provided in the hot rolling mill or can be a separate compressor station for supplying one or more devices 100 with compressed air.

Figure 4:
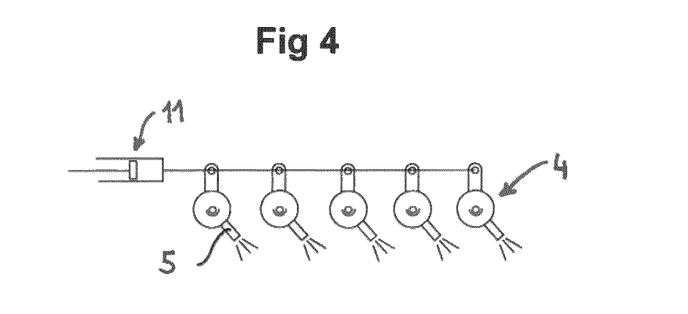
FIG. 4 shows a diagram for adjusting the spray angle of nozzle rows by means of an actuator 11.

Adjustment of nozzle rows 4 by an actuator 11 is shown in FIG. 4. The nozzle rows 4 are rotatably suspended (shown symbolically by a bearing shell in the middle of the nozzle rows) so that the spray angle of the nozzles 5 can be adjusted during operation.

Figure 5:
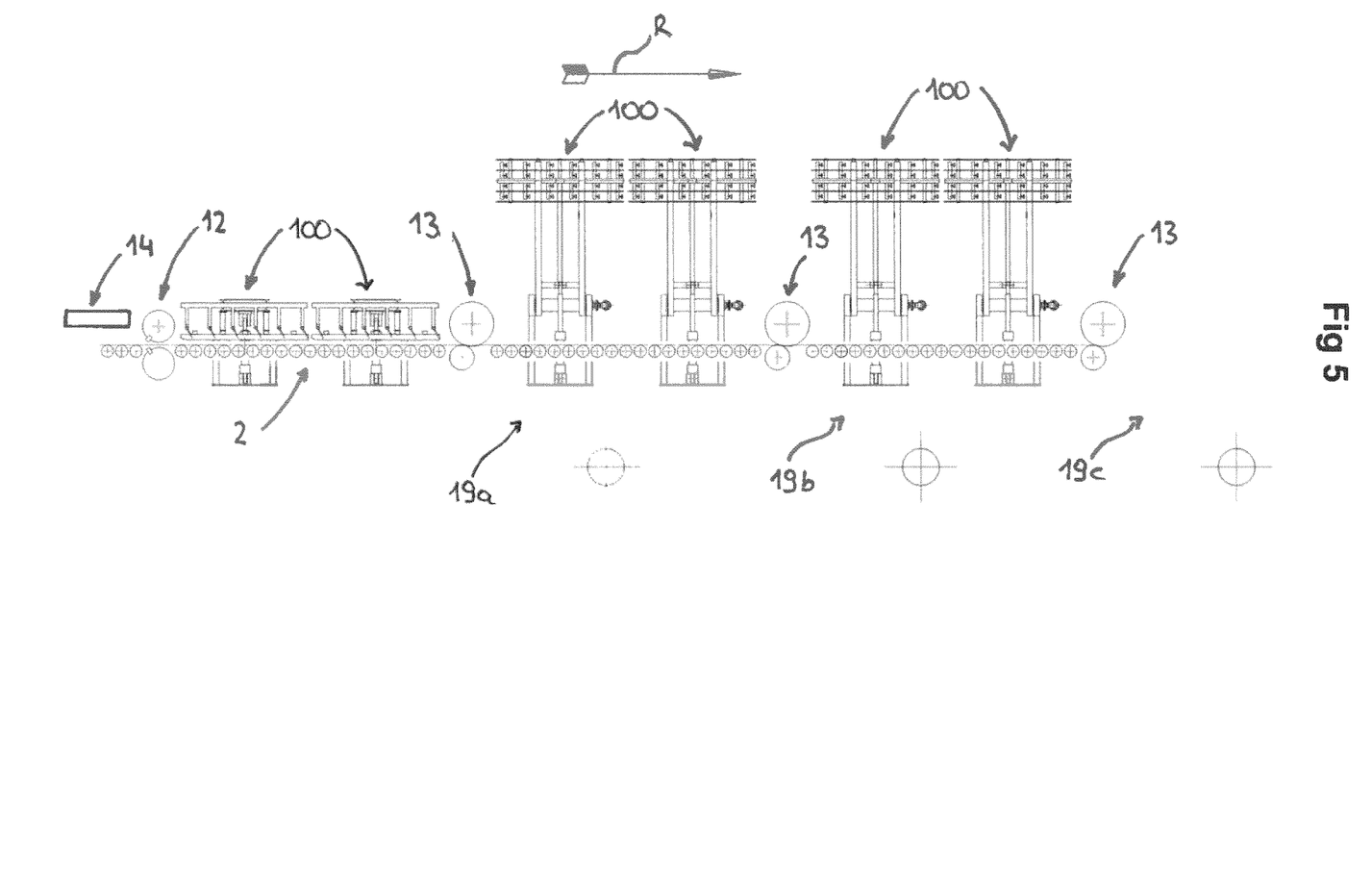
FIG. 5 shows a front view of a plurality of devices 100 according to the invention in a hot rolling mill.

FIG. 5 shows an arrangement of a plurality of devices 100 according to the invention in a hot rolling mill. Shears 12 arranged downstream of a cooling zone 14, which can cut a band, are not shown here. In the case of an Arvedi-ESP thin slab casting and rolling TCSR, the band is in an endless state until the cutting by the shears 12. A band head is created only as a result of the cutting (see designations 1a in FIG. 2a). For illustration purposes, it is to be assumed here that the band is initially to be wound on the first winding device 19a and the band is then to be wound on the second winding device 19b. Before the cutting of the band by the shears 12, in addition to the two devices 100 between the shears 12 and the winding device 19a the two devices 100 following in the band run direction R are pivoted inward toward the band and the nozzles are supplied with compressed air. By the cutting of the band, a band head is created and guided through the four inwardly pivoted devices 100 on the roller table 2 toward the winding device 19b. After commencement of the winding of the band by the winding device 19b, the devices 100 can be pivoted upward again since the band is stabilized by the band tension during the winding.

Figure 6A:
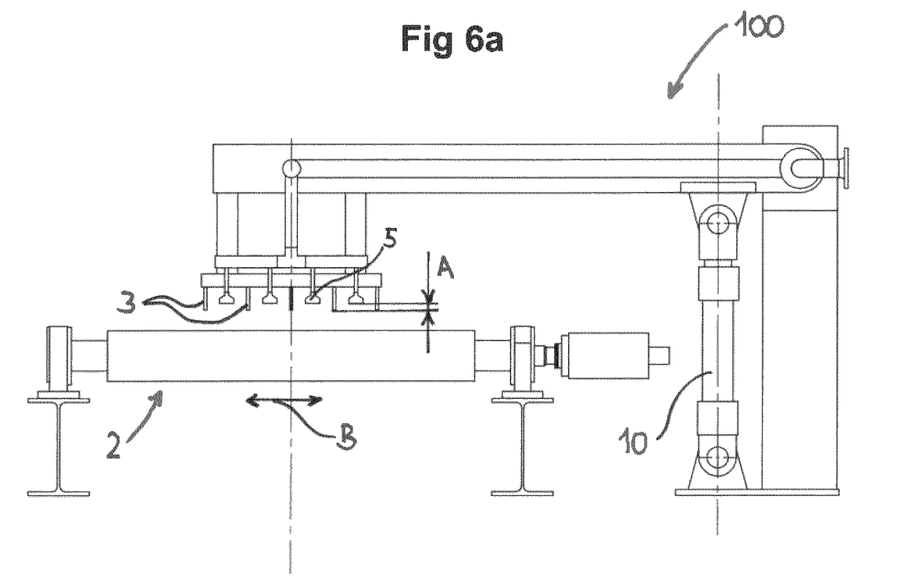
FIGS. 6a, 6b, 6c show a front view, a plan view and a side view, respectively of a device 100 according to the invention in an inwardly, downwardly pivoted state.
Figure 6B:
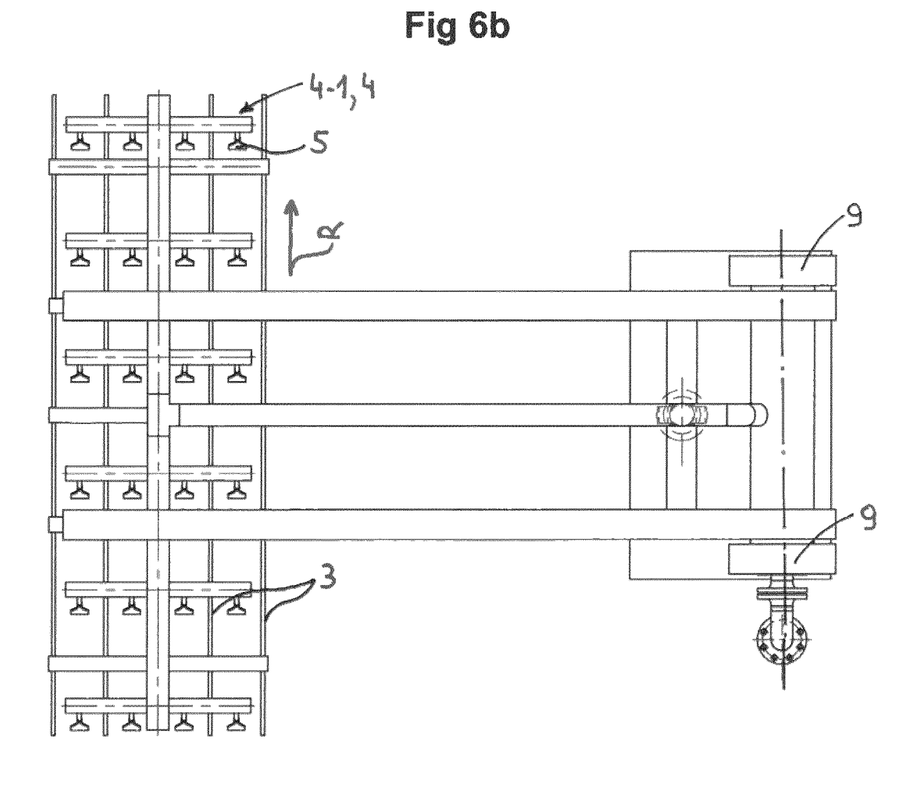
Figure 6C:
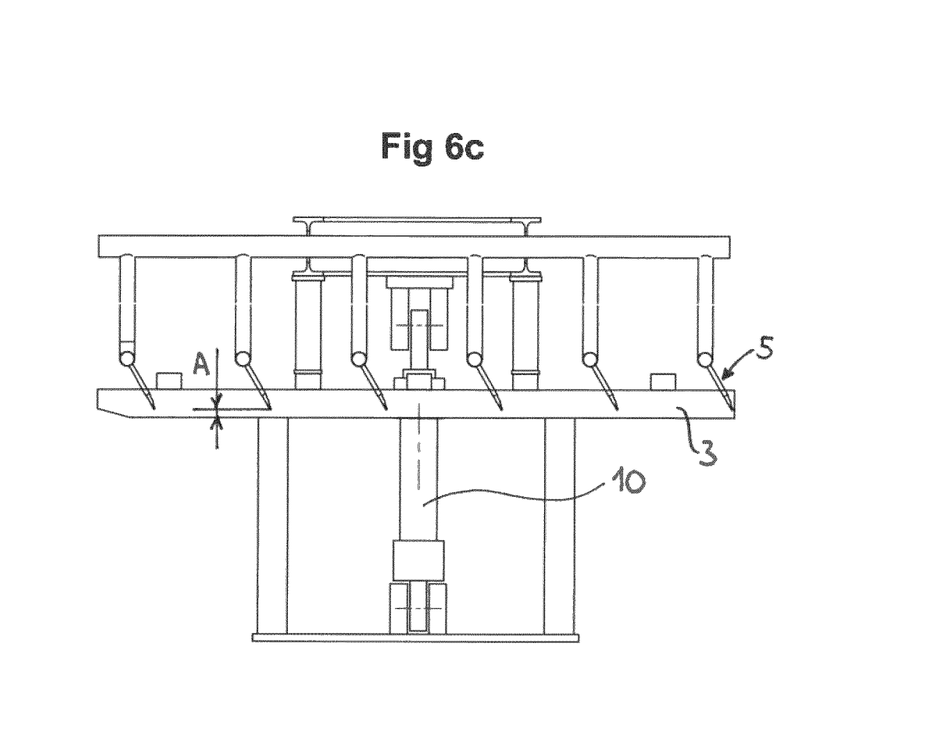

FIGS. 6a to 6c show three views of a device 100 according to the invention, which via an articulated drive 10 (in this case a hydraulic or pneumatic cylinder), can be pivoted away from a band, not shown. The nozzles 5, as shown in FIG. 6a, have a distance A to the underside of the protective runners 3 so that these cannot be damaged by the band. The roller table shown in FIG. 6a with a driven roller is not shown in FIGS. 6b and 6c for reasons of clarity.

Figure 7:
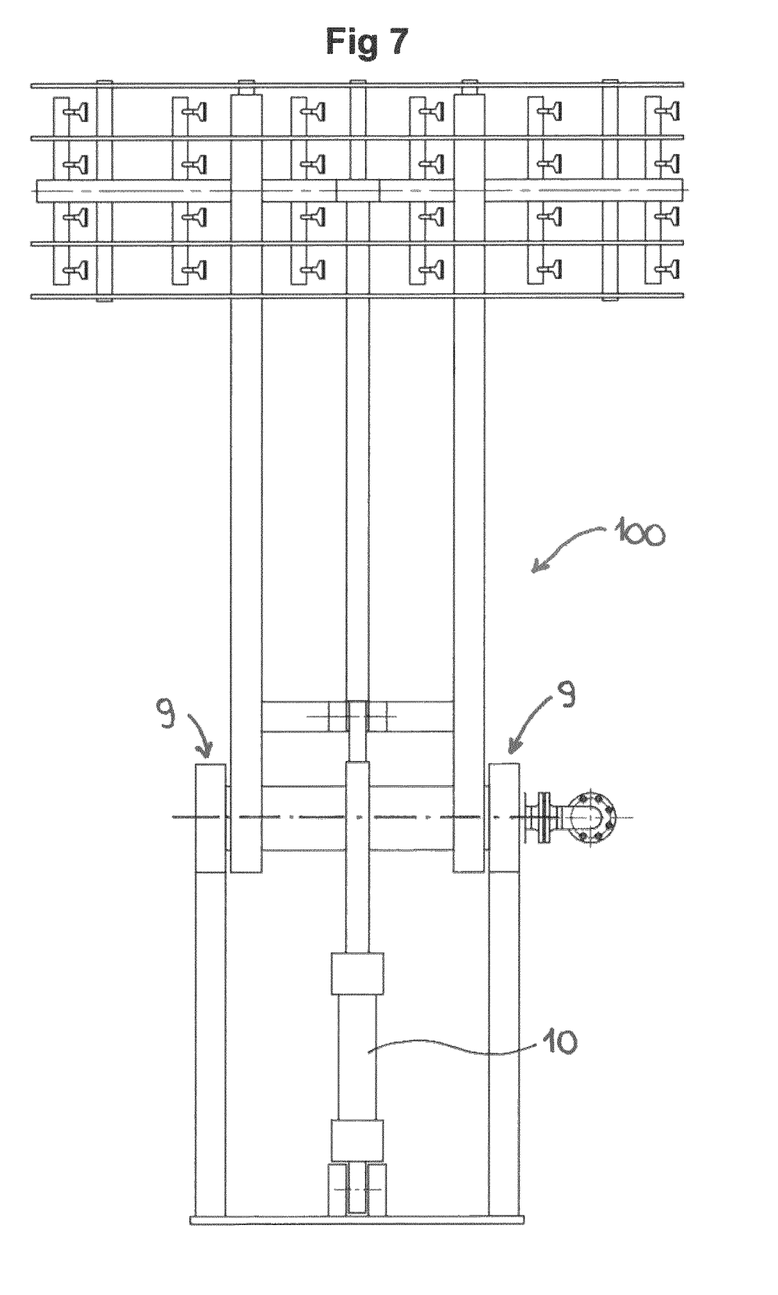
FIGS. 7 and 8 show a front view and a side view respectively of a device 100 according to the invention in an upwardly pivoted state.
Figure 8:
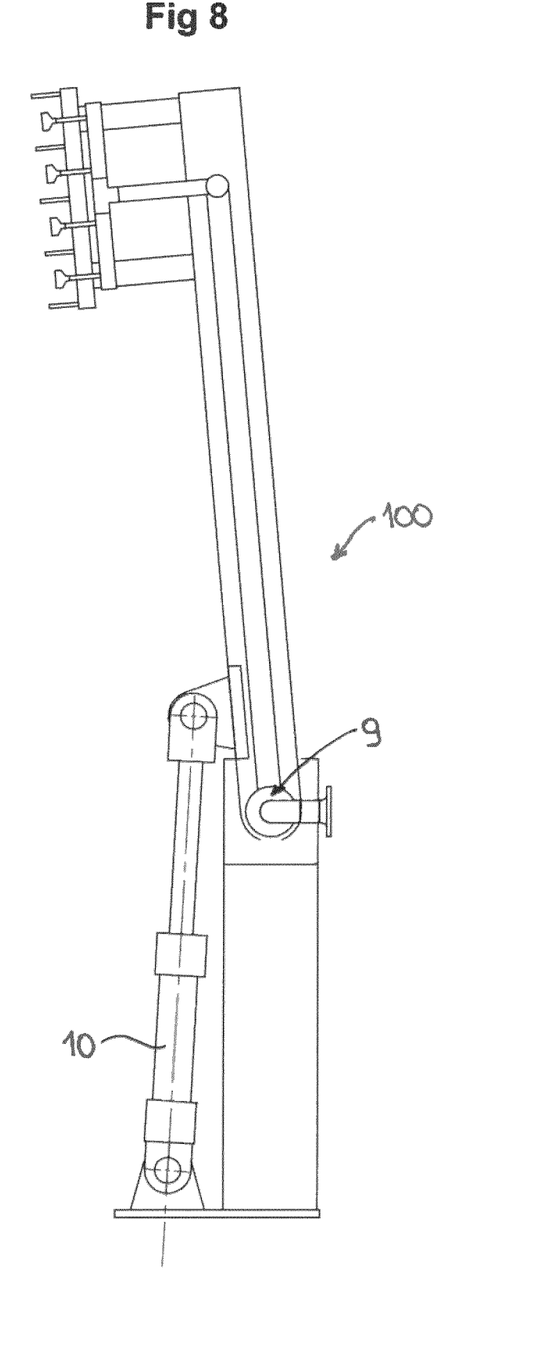

In FIGS. 7 and 8, the device 100 is shown in the upwardly hinged or upwardly pivoted state.

FIG. 9 shows a device 100 according to the invention having nozzle rows 4 and protective runners 3 arranged in the band run direction R. The outer and the inner nozzle rows 4 can be shut off via valves (in this case control valves) 15 symmetrically to the band center. Therefore, the compressed air consumption in this case of narrower bands can be reduced.

Figure 10:
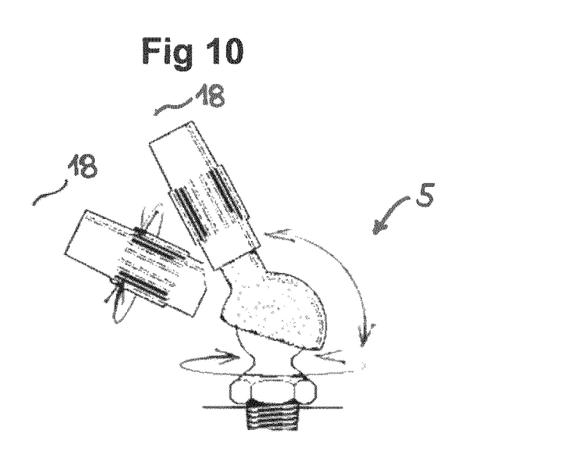
FIG. 10 shows a schematic view of a nozzle 5, the spray direction and spray jet 18 of which can be adjusted.

FIG. 10 schematically shows a view of a nozzle 5, the spray direction of which can be adjusted by means of a ball head and the spray jet 18 of which can be adjusted by rotation of the nozzle head. The nozzle 5 is detachably screwed into a pipe line by means of a thread. Therefore, the nozzle 5 can be exchanged in a simple manner in the event of blockage or wear.

Figure 11A:
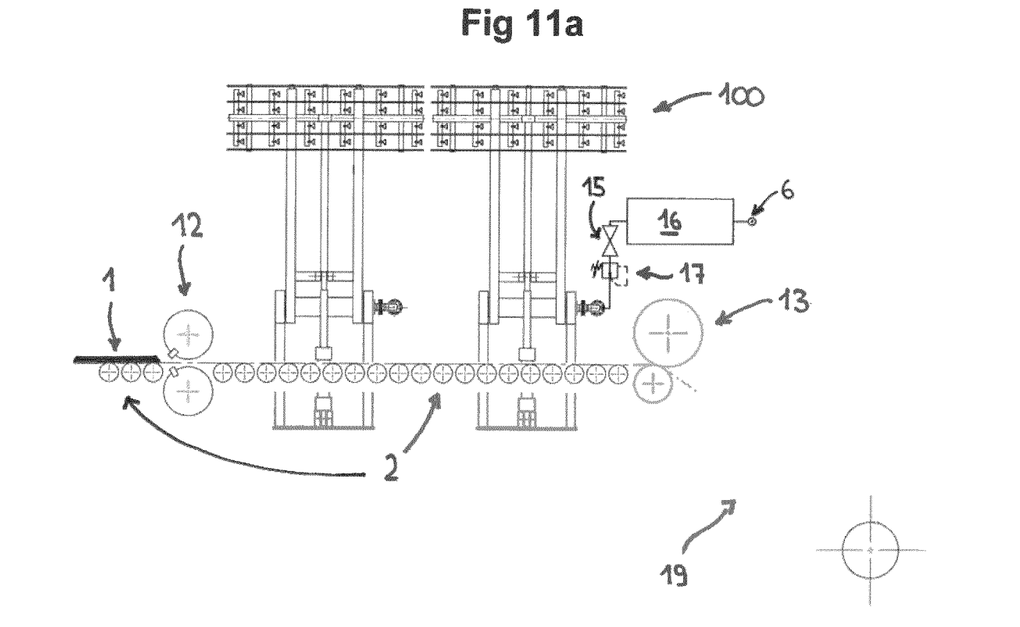
FIGS. 11a-11c show a schematic view of the method steps during stabilization of a thin band 1 in a hot rolling mill.
Figure 11B:
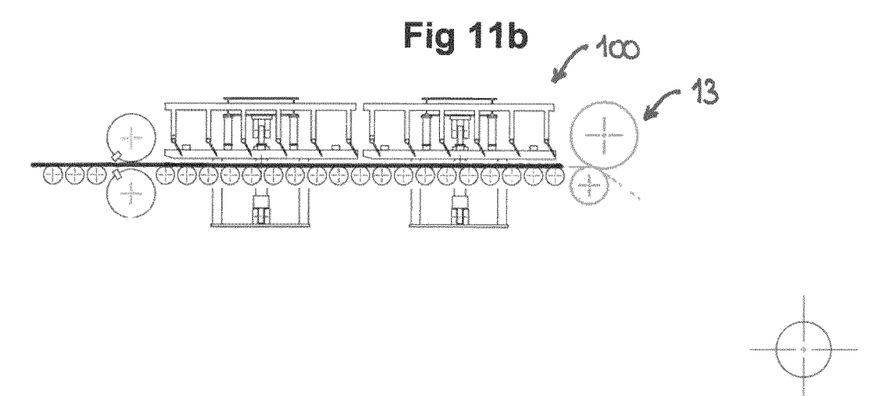
Figure 11C:
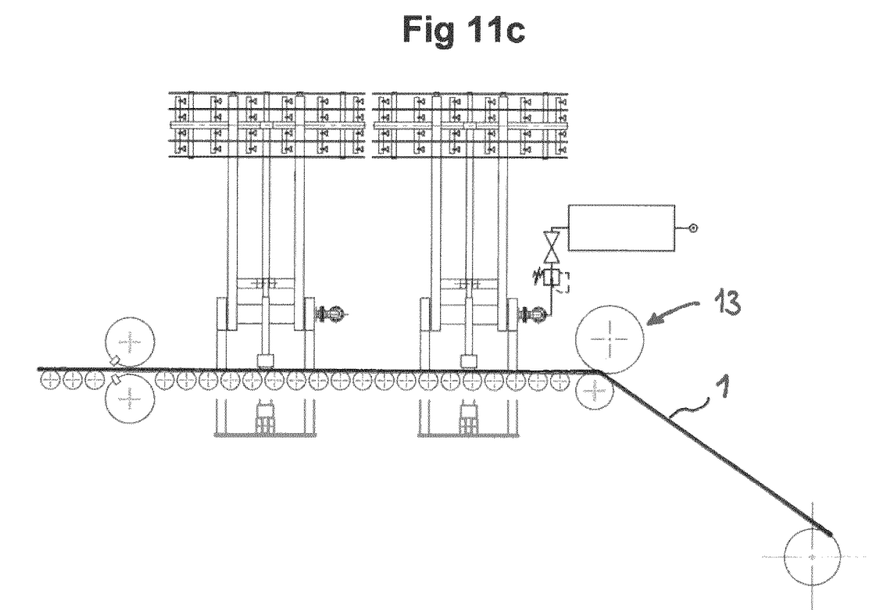

The steps of the method according to the invention are shown in FIGS. 11a to 11c. In FIG. 11a, a rolled band 1 consisting of steel with a thickness of 0.8 mm and at a speed of 16 m/s is moved on a roller table 2 toward shears 12. A compressed air accumulator 16 is charged by a compressed air supply 6 to a pressure of 6 bar. In this case, the valve 15 is closed and the two devices 100 are located in the upwardly pivoted state. The devices 100 are then pivoted inward toward the roller table 2 (see FIG. 11b) and the valve 15 is opened so that compressed air can flow from the compressed air accumulator 16 to the nozzles 5 of the devices 100. The pressure regulating valve 17 adjusts the pressure of the compressed air in the pipe lines to hold at a constant 4 bar and applied to the upper side of the band 1. The compressed air stabilizes the band 1 on the roller table 2 so that it does not begin to "fly" on account of flow forces. After the band 1 has been deflected by the winding drives 13 toward the winding device 19a and winding on has commenced, the valve 15 is closed again. As a result, the application of compressed air to the band is terminated. The devices 100 are then hinged upward again. After that, the compressed air accumulator 16 is charged again and the devices are prepared for the next sequence. The pressure of the compressed air can be mechanically adjusted via the pressure regulating valves 17. Alternatively, electrically adjustable pressure regulating valves or pressure-activated pressure regulating valves can also be used. The compressed air can also be applied in a flow rate-regulated manner via a flow rate regulator.

Although the invention has been fully illustrated and described in detail by means of the preferred exemplary embodiments, the invention is not limited by the disclosed examples and other variations can be derived therefrom by the person skilled in the art without departing from the extent of protection of the invention.

LIST OF DESIGNATIONS

1 Band
1a Band head
2 Roller table
3 Protective runner
4, 4-1 . . . 4-10 Nozzle row
5 Nozzle
6 Compressed air supply
7 Network of pipe lines
8 Common pipe line
9 Joint
10 Articulated drive
11 Actuator
12 Shears
13 Winding driver
14 Cooling zone
15 Valve
16 Compressed air accumulator
17 Pressure regulator
18 Spray jet
19 Winding device
100 Device for stabilization
A Distance
B Width direction of the band
$F_A$ Lift force
G Gravity force
R Band run direction
t Band thickness
v Speed
α Angle

The invention claimed is:

1. A device for stabilizing a rolled metal band, on a roller table in a hot rolling mill, wherein the band has an upper side and a lower side and the band is moved in a band run direction on the roller table, the device comprising:
   a plurality of protective runners, each runner oriented in a band run direction, and configured for guiding the rolled band, wherein the protective runners are arranged above the roller table and the protective runners have a distance between each other in a width direction of the band;
   a plurality of nozzle rows arranged in the band run direction or in a width direction of the band, each nozzle row has a plurality of nozzles, the nozzles are set back in relation to an underside of the protective runners so that an upwardly bent band does not contact the nozzles; and
   a compressed air supply, and a network of hose lines or pipe lines coupled to the compressed air supply for supplying the nozzles with compressed air; and
   the nozzles are oriented and configured to apply compressed air to the upper side of the band for stabilizing the movement of the band on the roller table.

2. The device as claimed in claim 1, wherein the device has at least three of the protective runners.

3. The device as claimed in one claim 1, wherein in a nozzle row, at least one of the nozzles is arranged between two of the protective runners.

4. The device as claimed in claim 1, further comprising a common hose line or pipe line configured for supplying the nozzles of a nozzle row with compressed air.

5. The device as claimed in claim 1, wherein the device is pivotable toward the band and away from the band, a joint about which the device is pivotable and an articulated drive operable to cause the pivoting of the device.

6. The device as claimed in claim 1, wherein each of the nozzles is a single-orifice nozzle, a multi-orifice nozzle and/or a round jet nozzle or a flat jet nozzle, or a multi-channel flat jet nozzle.

7. The device as claimed in claim 1, wherein a plurality of the nozzles have an adjustable orientation in relation to the band.

8. The device as claimed in claim 7, further comprising an actuator configured and operable to adjust the orientation of one or more of the nozzle rows in relation to the band.

9. The device as claimed in claim 1, further comprising one or more of the nozzles of a nozzle row is configured to be shut off.

10. The device as claimed in claim 1, wherein a pressure of the compressed air is adjustable by the compressed air supply and/or by a valve arranged between the compressed air supply and the nozzles.

11. The device as claimed in claim 10, further comprising a pressure regulator for adjusting the compressed air in a hose line or a pipe line or a flow rate regulator.

12. The device as claimed claim 1, further comprising at least one compressed air accumulator and a valve installed between the compressed air supply and a hose line or a pipe line, wherein the compressed air accumulator covers consumption peaks and the valve is configured to release and shut off the throughflow of compressed air from the compressed air accumulator.

13. A hot rolling mill with a device as claimed in claim 1, further comprising shears arranged downstream of a cooling zone, and the device is arranged between the shears, and a winding device for the band or between two of the winding devices.

14. A method for stabilizing a band run of a rolled band, wherein the band run is on a roller table in a hot rolling mill according to claim 13, wherein the band has thickness of $t \leq 1.2$ mm, and the band is moved on the roller table at a speed of $\geq 5$ m/s, the method comprising the steps:

guiding the device onto the upper side of the band;
applying compressed air at a pressure p to the upper side of the band by means of the nozzles of the device, for stabilizing the movement of the band on the roller table;
terminating the application of compressed air; and
guiding the device away from the band.

15. The method as claimed in claim 14, further comprising before the application of compressed air:
closing a valve arranged between a compressed air accumulator and a nozzle of the device; and
replenishing the compressed air accumulator to a pressure >p.

16. The method as claimed in claim 14, further comprising during the application of compressed air, at least partially opening a valve, which is arranged between a compressed air accumulator a nozzle of the device, for causing the compressed air to flow to the nozzle.

17. The method as claimed in claim 16, further comprising adjusting the opening of the valve in a flow rate regulated or pressure regulated manner.

18. The method as claimed in claim 14, further comprising the guiding of the device is carried out by means of inward pivoting or lowering and/or the guiding away of the device is carried out by pivoting away or lifting.

* * * * *